Dec. 18, 1956  S. G. ESKIN  2,774,541
THERMOSTATICALLY OPERATED SHUT-OFF VALVE
Filed Aug. 25, 1954
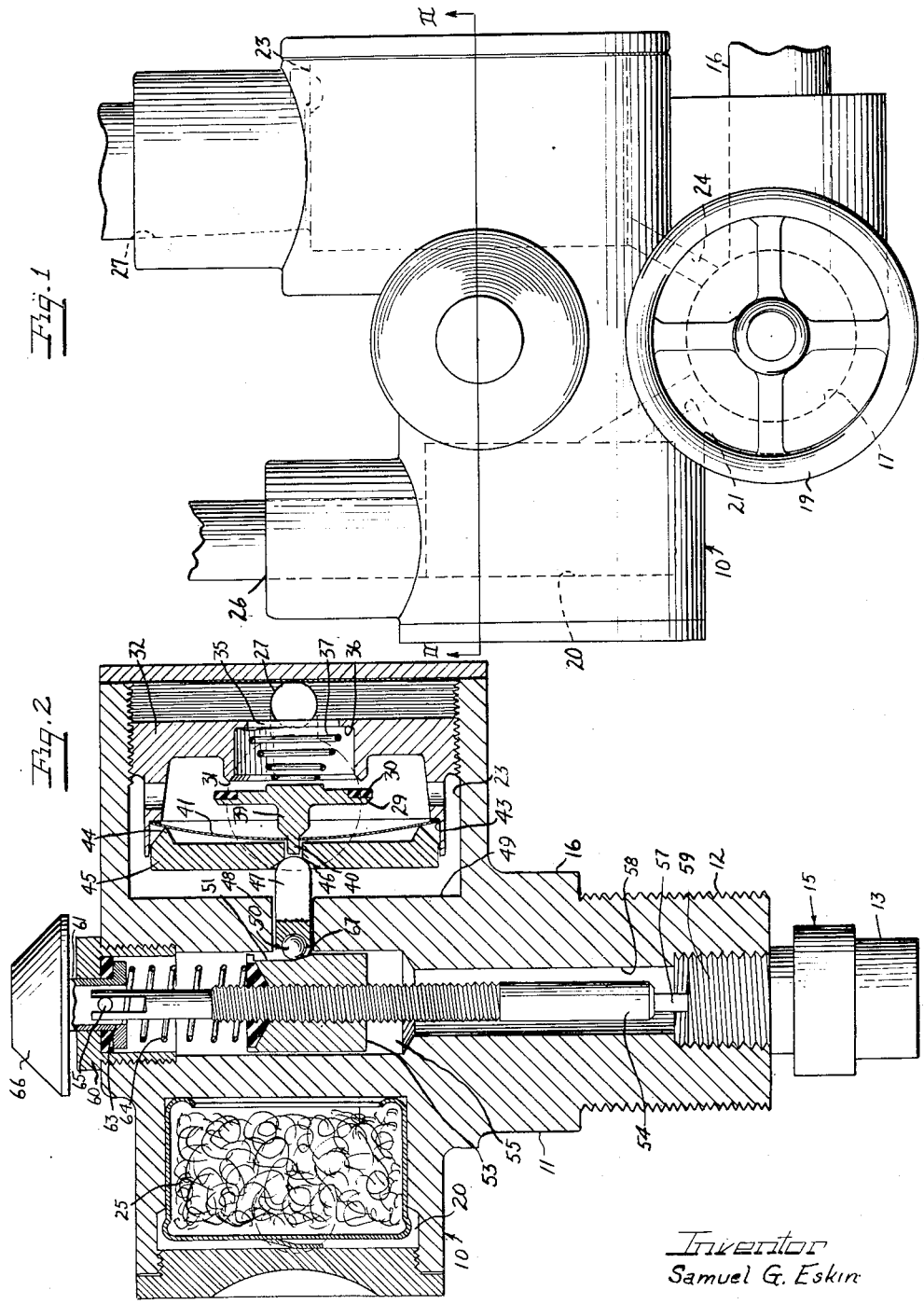
Inventor
Samuel G. Eskin

United States Patent Office 2,774,541
Patented Dec. 18, 1956

2,774,541

THERMOSTATICALLY OPERATED SHUT-OFF VALVE

Samuel G. Eskin, Chicago, Ill., assignor to The Dole Valve Company, Chicago, Ill., a corporation of Illinois Application August 25, 1954, Serial No. 452,142

3 Claims. (Cl. 236—48)

This invention relates to improvements in thermostatically operated shut-off vales and more particularly relates to such valves adapted to control the supply of gas to a main gas burner.

A principal object of my invention is to provide a simple and positively acting thermostatically operated valve for shutting off the flow of fluid at the temperature at which the thermostatic operating device therefor is set.

A further object of my invention is to provide a more efficient positively acting shut-off valve in which a wax or power type of thermostatic element operates to positively shut off the valve when the temperature reaches the operating range of the thermostatic element.

A still further object of my invention is to provide a more efficient and economical positively acting shut-off valve than formerly particularly adapted to control the flow of gas to a main gas burner for a hot water heater, in which a wax type of thermostatic element having a positively moving plunger is utilized to operate the valve to shut off the supply of gas to the burner.

Still another object of my invention is to provide a simpler more compact and economical form of thermostatically operated valve than formerly, by utilizing a wax or power type thermostatic element having a plunger extensible within the body for the valve, and by providing a right angled operating means from the plunger to the valve.

Still another object of my invention is to provide an inexpensive and simple thermostatically operated control device by utilizing a wax or power type of thermostatic element to shut off a valve through a right angled cam and operating connection to the valve.

Another and important object of my invention is to provide a thermostatically operated control device in which the compactness of the device is attained by the use of a power type of thermostatic element having an extensible plunger operating the valve by a right angled cam and snap acting mechanism.

These and other objects of my invention will appear from time to time as the following specification proceeds and with reference to the accompanying drawings wherein:

Figure 1 is a top plan view of a thermostatically operated valve constructed in accordance with my invention; and Figure 2 is an enlarged transverse sectional view taken substantially along line II—II of Figure 1.

In the embodiment of my invention illustrated in the drawing, I have shown a valve 10 which may control the supply of gas to the pilot and main burner of a gas hot water heater. The valve 10 is shown as having a body 11 having a threaded boss 12 adapted to be threaded within the wall of a hot water heater, to immerse a casing 13 of a thermostatic element 15 therein.

While the boss 12 is shown as being threaded for threading within the wall of a hot water heater, it should be understood that the boss need not be threaded and that if desired the valve may be strapped to the wall of the heater to press the thermostatic element in engagement therewith.

The valve 10 is shown as having a main gas inlet 16 leading into a valve chamber 17 under the control of a hand wheel 19 operating a main gas cock (not shown) to supply gas to a filter chamber 20 through a passageway 21 and to a valve chamber 23 through a passageway 24.

The filter chamber 20 is shown as having a filter element 25 therein for filtering foreign material from the gas before it passes through a pilot gas outlet 26. It should here be understood that when the gas cock (not shown) is turned to "on" position that the pilot will continually be supplied with gas, as will the valve chamber 23.

Gas leaves the valve chamber 23 to supply gas to a main gas burner or the like through an outlet 27 under control of a valve 29 having an annular valve surface 30 engageable with an annular seat 31 formed in a passageway member 32, herein shown as being threaded within the valve chamber 23. The passageway member 32 is shown as having a port or passageway 35 leading therethrough having a shoulder 36 formed therein forming a seat for a spring 37 engaging the valve member 29 within the annular valve portion 30 thereof and biasing the valve in an open position.

The valve 29 is shown as having a central boss 39 extending outwardly therefrom in a direction away from the seat 31 and having a stem 40 carried in a snap acting disk 41. The snap acting disk 41 is shown as slidably engaging on its side which faces the valve 29, a shouldered annular seat 43 formed in the passageway member 32. The opposite side of said disk is abutted by an annular fulcrum 44 of an operating member 45, spaced inwardly of the annular seat 43. The operating member 45 is shown as having a socket 46 on the side opposite the disk 41, engaged by the convex end of a plunger 47 slidably guided in a guide passageway 48 leading through a wall 49 of the valve body 11. A ball 50 carried in the opposite end of the plunger 46 from the operating member 45 is shown in Figure 2 as engaging a recessed portion 51 of a cam member 53, herein shown as being in the form of a collar threaded on a threaded operating rod 54.

The cam member 53 and operating rod 54 are shown as being movable within a passageway 55 extending along the valve body at right angles to the valve chamber 23 and valve seat 31 and opening to each end of the valve body. The cam 53 may have a flat side (not shown) as may the passageway 55 along which the cam slides, to effect linear movement of said cam along the operating rod, upon turning movement of said rod.

The cam operating rod 54 is shown as abutting a power member or plunger 57 extensible from a cylinder 59 of the thermostatic element 15. The cylinder 59 is threaded within a passageway 58 forming a continuation of the passageway 55 and preferably circular in cross section and positioning the power member 57 in axial alignment with the plunger 54.

The recessed portion 51 of the cam member 53 is shown as terminating at its end adjacent the thermostatic element 15 into an inclined cam face 67 engageable with the ball 50 and moving said ball and the plunger 47 along the passageway 48 upon extension of the plunger 57 from the cylinder 59.

The thermostatic element 15 is shown as being a so-called wax or power type of thermostatic element, the cylinder 59 of which forms a guide for the power member 57. The power member 57 is abutted at its inner end by a flexible seal or membrane (not shown) containing a fusible thermally expansible material within the casing 13 and fusible at the operating range of the thermostatic element, for extending the power member 57 from the cylinder 59 upon fusion of the thermally expansible material.

The thermally expansible material may be a wax alone, such as a microcrystalline wax, or may be a microcrystalline wax in composition with a metal powder and a binder, such as is shown and described in Patent No. 2,259,846, which issued to Sergius Vernet on October 24, 1941. The thermostatic element itself may be of the same general type as is shown and described in the Vernet Patent No. 2,128,274, dated August 30, 1938. Such types of thermostatic elements are relatively simple and inexpensive and exert a positive driving force against the power member 57, which drives the power member with far more power, a far greater distance than other types of thermostatic elements.

The thermostatic element 15 has therefore been selected for its reliability, inexpensiveness and simplicity and for the power of its power member or plunger and the relatively long travel thereof, compared with other types of thermostatic elements, together with the compact overall size of the element, rendering the element adaptable to being strapped to the wall of a hot water heater or to being immersed in the fluid being heated.

A flanged collar 60 is shown as being threaded in the opposite end of the chamber 55 from the thermostatic element 15 and as forming a guide for a flanged sleeve 61, flanged at its inner end and biased into engagement with a seal 63 by a compression spring 64. The opposite end of the compression spring from the flange of the flanged sleeve 61 is shown as abutting the cam member 53 and as biasing the operating member 54 into engagement with the plunger 57 and as serving as a return spring for power member or plunger 57. The end of the operating rod 54 opposite from the plunger 57 is shown as being slotted with the slot thereof opening to the end thereof and having a transverse pin 65 extending thereacross. The pin 65 is carried at the ends in the sleeve 63. A knob 66 is shown as being connected with the sleeve 63 on the outer side of the valve body 11, and affording a means for turning the operating rod 54 and varying the tension of the spring 64 and the position of the cam 53 along the rod 54, and the position of the inclined face 67 of said cam with respect to the ball 50, to vary the travel of the piston 57 necessary to engage the cam face 67 with the ball 50 and thus to vary the temperature at which the thermostatic element 15 operates to effect closing of the valve 29.

It may be seen from the foregoing that when the boss 12 is threaded in the wall of a tank or hot water heater or like device, with the casing 13 of the thermostatic element 15 in contact with the medium being heated, and when the temperature of the water reaches the fusion point of the thermal expansible material contained within the casing 13, that the thermally responsive material will expand against the membrane (not shown) containing the thermally responsive material within said casing, and force the power member 57 from the cylinder 59 as long as the fusible material expands.

Extension of the power member 57 from the cylinder 59 will move the operating rod 54 and cam member 53 along the passageway 55 in a direction toward the temperature adjustment knob 66. This will bring the inclined cam surface 67 into engagement with the ball 50 and force said ball to move along the guide passageway 47 and move the valve operating member 45 in a direction, which in Figure 2 is towards the right. The fulcrum points of the operating member 45 engaging the snap acting disk 41 adjacent the periphery thereof and inwardly of the shouldered seat 43, will snap the disk to the opposite side of its dead center position from the position shown in Figure 2 engaging the annular valve 30 with the seat 31 with a snap action to block the passage of gas through the passageway 35 to the outlet 27.

As the temperature of the medium being heated is reduced below the operating range of the thermostatic element 15 the spring 64 will retractably move the power member 57 through the operating rod 54 and will disengage the inclined camming surface 67 of the cam member 53 from the ball 50, and accommodate the spring 37 to move the valve 29 to the open position shown in Figure 2, the snap acting disk 41 snapping back to the position shown in Figure 2.

It may be seen from the foregoing that an extremely simple and compact form of positively acting shut-off valve has been provided for shutting off the flow of gas to a main gas burner upon high temperature conditions, and that the positive action simplicity and compactness of the valve is attained by the use of a wax or power type of thermostatic element and by the right angled position of the valve chamber with respect to the thermostatic element and power member therefor.

It will be understood that various modifications and variations of the present invention may be effected without departing from the spirit and scope of the novel concepts thereof.

I claim as my invention:

1. In a thermostatically operated shut-off valve of the class described, a valve body having a power member guided therein for movement therealong for operating a device to be operated, a cylinder extending within said valve body and forming a guide for said power member, a casing forming an outward continuation of said cylinder and containing a fusible thermal responsive material in association with said cylinder, for extending said power member from said cylinder upon predetermined temperature rises, a valve chamber within said valve body, an inlet into said valve body and chamber and an outlet therefrom, a valve seat separating said inlet from said outlet, a rectilinearly movable valve engageable with said seat, a snap acting disk supported adjacent its periphery within said valve chamber and carrying said valve, an operating member for said disk having fulcrum points engaging said disk inwardly of its support, a rectilinear guide for said operating member, and a right angled drive from said power member to said operating member comprising a ball having engagement with said operating member, and a cam operated by said power member and movable at right angles to the axis of movement of said operating member and valve, said cam having an inclined cam surface engageable with said ball to move the same to effect movement of said snap acting disk past its dead center position, to move said valve into engagement with said seat with a snap action upon the extension of said power member from said cylinder effected by said predetermined temperature rises.

2. In a thermostatically operated valve of the class described, a valve body having a power member guided for movement therealong, guide means for said power member comprising a cylinder extending within said valve body, means for extending said power member within said valve body comprising a casing extending from said cylinder on the outside of said valve body and containing a fusible thermally responsive material, an operating rod in axial alignment with said power member, a cam member guiding said operating rod for movement along said valve body, a spring biasing said operating rod in engagement with said power member and returning said power member upon predetermined reductions in temperature, a valve chamber in said valve body disposed at right angles to the axis of said power member and having a passageway opening toward said cam member, an inlet into said valve body and chamber, an outlet from said valve chamber, a valve seat in said valve chamber dividing said inlet from said outlet, a rectilinearly movable valve engageable with said seat, spring means biasing said valve out of engagement with said seat, said valve having a central boss extending in a direction away from said seat and spring means and having a stem on the end of said boss, an over center snap acting disk having a central apertured portion through which said stem extends, a stationary support for said disk adjacent the periphery thereof, an operating member for said disk having an annular fulcrum engaging said disk inwardly of said stationary support and having said valve stem slidably guided therein, a ball engaging said cam member and moved thereby along said passageway upon extensible movement of said power member, and a plunger interposed between said ball and operating member for moving said operating member to snap said disk over center upon extensible movement of said power member with respect to said cylinder effected by certain predetermined increases in temperature.

3. In a thermostatically operated valve of the class described, a valve body having a power member guided for movement therealong, guide means for said power member comprising a cylinder extending within said valve body, means for extending said power member within said valve body comprising a casing extending from said cylinder on the outside of said valve body and containing a fusible thermally responsive material, a cam guided for movement along said valve body in the direction of the axis of said power member, an operating rod extending along said valve body and having said cam threaded thereon and guided by said cam to move in the direction of the axis of said power member, a spring engaging said operating rod with said power member, a valve chamber in said valve body disposed at right angles to the axis of said power member, an inlet into said valve body and chamber, an outlet from said valve chamber, a valve seat in said valve chamber dividing said inlet from said outlet, a valve engageable with said seat, spring means biasing said valve out of engagement with said seat, an over center snap acting disk supported in said valve chamber at its edge, an operating member for said snap acting disk having an annular fulcrum engaging said disk inwardly of the support for said disk, an engaging connection between said valve and disk supporting said valve for movement toward and from said seat, a communicating passageway between said valve chamber and said cam member, said cam member having a cam face facing said passageway, a ball engaging said cam face and a plunger guided for movement along said passageway and operated by said ball to operate said operating member to snap said disk over center upon extensible movement of said power member, and a knob on the outside of said valve body and having operative connection with said operating rod for turning the same and varying the position of said cam therealong to vary the travel of said cam required to snap said valve closed and thus to vary the operating temperature of said power member.

References Cited in the file of this patent

UNITED STATES PATENTS

| | | |
|---|---|---|
| 1,910,230 | Bastian | May 23, 1933 |
| 1,978,709 | Hill | Oct. 30, 1934 |
| 2,532,896 | Dillman | Dec. 5, 1950 |
| 2,548,941 | Brown | Apr. 17, 1951 |

FOREIGN PATENTS

| | | |
|---|---|---|
| 370,125 | Great Britain | Apr. 7, 1932 |